（12）United States Patent
Aimo Boot

(10) Patent No.: US 8,666,594 B2
(45) Date of Patent: Mar. 4, 2014

(54) METHOD FOR ACTUATING THE STOP AND START FUNCTION IN A MOVING VEHICLE, ESPECIALLY AN INDUSTRIAL OR COMMERCIAL OR SPECIAL VEHICLE

(75) Inventor: Marco Aimo Boot, Caselle Torinese (IT)

(73) Assignee: Iveco S.p.A., Turin (IT)

( * ) Notice: Subject to any disclaimer, the term of this patent is extended or adjusted under 35 U.S.C. 154(b) by 9 days.

(21) Appl. No.: 13/261,444

(22) PCT Filed: Mar. 25, 2011

(86) PCT No.: PCT/EP2011/054586
§ 371 (c)(1),
(2), (4) Date: Sep. 25, 2012

(87) PCT Pub. No.: WO2011/117373
PCT Pub. Date: Sep. 29, 2011

(65) Prior Publication Data
US 2013/0024056 A1 Jan. 24, 2013

(30) Foreign Application Priority Data
Mar. 25, 2010 (EP) .................................... 10425093

(51) Int. Cl.
*G06F 7/00* (2006.01)
*B60L 11/00* (2006.01)
(52) U.S. Cl.
USPC ............... 701/36; 701/22; 701/67; 701/68; 701/48; 74/473.1; 74/661
(58) Field of Classification Search
None
See application file for complete search history.

(56) References Cited

U.S. PATENT DOCUMENTS

| 5,943,918 | A | * | 8/1999 | Reed et al. | ................... 74/661 |
| 6,316,842 | B1 | * | 11/2001 | Kuroda et al. | .............. 290/40 C |
| 6,839,619 | B2 | * | 1/2005 | Bellinger | ..................... 701/103 |
| 7,610,143 | B1 | | 10/2009 | Boesch | |
| 2002/0043410 | A1 | * | 4/2002 | Suzuki | ......................... 180/65.2 |
| 2004/0046394 | A1 | | 3/2004 | Lim | |
| 2009/0062062 | A1 | | 3/2009 | Choi | |
| 2010/0125021 | A1 | * | 5/2010 | Matsubara et al. | ................ 477/5 |
| 2011/0203400 | A1 | * | 8/2011 | Ahner | .......................... 74/473.1 |

FOREIGN PATENT DOCUMENTS

| DE | 102004024212 | | 12/2005 |
| DE | 102007061205 | A1 * | 10/2008 |
| EP | 1036696 | | 9/2000 |

OTHER PUBLICATIONS

DE 102007061205 A1 (machine translation).*

* cited by examiner

*Primary Examiner* — Helal A Algahaim
*Assistant Examiner* — Paul Castro
(74) *Attorney, Agent, or Firm* — Stetina Brunda Garred & Brucker

(57) ABSTRACT

The present invention relates to a method for actuating the stop & start function in a moving vehicle, especially an industrial or commercial or special vehicle, said vehicle being equipped with hybrid drive of the parallel type, comprising a thermal engine (1), an electric motor-generator (2), a single clutch unit (3) placed between the two engines, a transmission system (6) comprising an automated manual transmission, a hybrid power steering both hydraulic and electric, the method comprising the steps of enabling of the stop phase, activation of the stop phase, maintaining of the stop phase, activation of the start phase.

6 Claims, 7 Drawing Sheets

METHOD FOR ACTUATING THE STOP AND START FUNCTION IN A MOVING VEHICLE, ESPECIALLY AN INDUSTRIAL OR COMMERCIAL OR SPECIAL VEHICLE

APPLICATION FIELD OF THE INVENTION

The present invention relates to a method for actuating the stop & start function in a vehicle while moving, especially an industrial or commercial or special vehicle, and more precisely in a vehicle equipped with hybrid drive of the parallel type, with single clutch.

DESCRIPTION OF THE PRIOR ART

With reference to FIG. 1, a type of industrial or commercial or special vehicle equipped with hybrid drive of the parallel type is known in the art, comprising a thermal engine 1, an electric motor-generator 2, equipped with a DC/AC inverter and a high-tension electric drive battery 5, a single clutch unit 3 placed between the two engines, and a transmission system 6 comprising an automated manual transmission. The latter is substantially a mechanical gearbox wherein electric actuators are present and are controlled by a specially provided control unit which manages the shifting requests and the clutch control, according to the drive management strategies of the two engines, thermal and electric.

In this type of vehicle the following operating modes are known:

Stop & Start function: The thermal engine is stopped when zero speed is reached. When the brake pedal is released, the thermal engine is quickly and independently restarted by means of the motor-generator.

Electric launch function and creeping: The vehicle starts moving by means of the electric motor keeping the thermal engine idle at each restarting; the motor-generator is also used to move the vehicle at low speed (creeping), a phase in which the thermal engine is highly inefficient.

Hybrid mode (electric power boost) of the parallel type: The power required for moving the vehicle is provided by combining the contribution of the electric motor and of the thermal engine (torque split). When the power of the vehicle temporarily increases and the thermal engine contribution is not enough, the electric motor provides the missing power (booster).

Regenerative braking function: The kinetic energy of the vehicle is converted, during the braking phases, into electric energy by the motor-generator and is stored in the high tension electric drive battery by means of the inverter.

Static mode with stationary vehicle: The thermal engine is stopped. The energy stored in the battery is used to power some auxiliary devices of the vehicle by means of the power takeoff PTO directly activated by the electric motor-generator (e.g.: waste collection vehicle).

In order to improve the vehicle's functionalities as for, above all, the reduction of fuel consumption and of pollutant emissions and also of noise emissions, a further operating mode would be provided consisting in the stop & start function while the vehicle is moving, thus increasing the time percentage in which the electric motor is working and the thermal engine is stopped.

Problems arise relating to the management of the operating logic of the two engines in order to control said stop & start function in a moving vehicle, namely the stopping and restarting of the thermal engine while moving, due above all to the presence of a single clutch unit, and also problems relating to the power steering, since when the thermal engine is stopped the hydraulic power steering does not work.

Presumably, in a parallel hybrid vehicle equipped with dual clutch, one upstream and the other downstream of the motor-generator, the management of the stop & start function with a moving vehicle would be easier.

SUMMARY OF THE INVENTION

Therefore the aim of the present invention is to provide a method for actuating the stop & start function in a moving vehicle, especially an industrial or commercial or special vehicles, suitable for overcoming all the drawbacks mentioned above.

In particular the subject of the present invention is a method for actuating the stop & start function in a moving vehicle, especially an industrial or commercial or special vehicle, as described more fully in the claims, which are an integral part of this description.

BRIEF DESCRIPTION OF THE FIGURES

Further purposes and advantages of the present invention will become clear from the following detailed description of a preferred embodiment (and its alternative embodiments) and the drawings that are attached hereto, which are merely illustrative and non-limitative, in which.

DETAILED DESCRIPTION OF THE INVENTION

Figure 1:
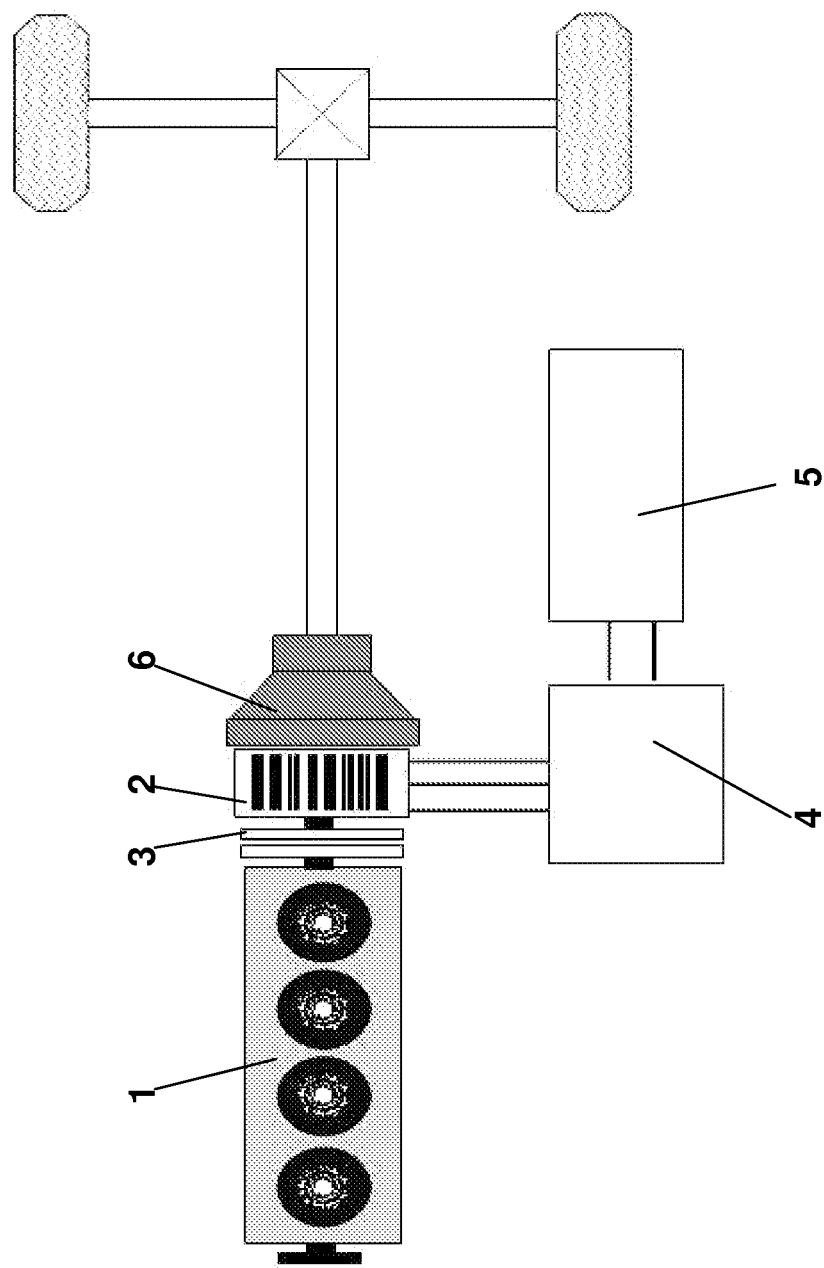
FIG. 1 shows a general scheme of a drive system of a vehicle suitable to realize the method according to the invention.

The present invention relates to the management of the stop & start function in a moving vehicle, for a vehicle of the type described above in reference to FIG. 1.

According to the present invention the actuation of the stop & start function in a moving vehicle is managed, namely the logic managing the function is able to evaluate instant by instant the possibility of stopping the thermal engine while the vehicle is moving if the enabling conditions are fulfilled. In the same way, it is able to restart the thermal engine while the vehicle is moving.

In particular, the control logic controls the engine stopping considering the following variables: released accelerator pedal, vehicle speed, road slope, battery charging status, drive of the electric motor, clutch opening, activation of the EPS system which controls the electric power steering, forward gear engaged (Drive). Even if only one of the conditions set by the control logic is not verified, the engine stopping is inhibited.

The starting or stopping strategy of the thermal energy may be optimized if the following additional system/information are available, in order to estimate the length of the stopping phase of the thermal engine with the vehicle moving: estimate of the payload of the vehicle; navigation system provided with electronic horizon, namely with the estimate of the profile and of the slope of the road in front of the vehicle, which allows to determine the time horizon in front of the vehicle.

Moreover a particular attention is devoted to the power steering.

The use of a completely electric steering actuator is known in the art, since the electric actuation is able to operate the power steering when the thermal engine is stopped, with any speed condition of the vehicle, both low (or zero) speed and high speed.

According to an aspect of the invention, the power steering is actuated by means of a coupling of a hydraulic and an electric system. This allows the actuation of the stop & start function even at quite high speed. At low speed the electric part alone is not enough, since the required steering torque is high, higher than a 24V electric power steering may provide (in case of an average and heavy vehicle the peak can be even of 4.5 kW): in these conditions the current withdrawal from the 24V standard battery is too high and there is the risk of discharging it, above all in case of repeated manoeuvres, while when exceeding a certain speed the required steering torque is highly reduced: for example when exceeding 30-40 Km/h the required torque is very low, at 5 Km/h already it reduces of 50%. On the other hand, if the thermal engine stops when the vehicle travels at low speed, the hydraulic power steering does not work, therefore in these conditions there would be no power steering.

Thus the stop & start function will be enabled only when the speed is higher than a speed threshold, namely the thermal engine will not stop at a speed lower than the threshold but only at a speed higher than the threshold, so that the only power steering intervening when exceeding the threshold will be the electric power steering, while for a speed lower than the threshold, the thermal engine will not stop, and therefore the hydraulic power steering will be working, ensuring a higher steering torque.

The thermal engine is completely automatically restarted, in the same way as for the stopping phase previously described, namely after verifying the status of the same system variables.

Figure 2:
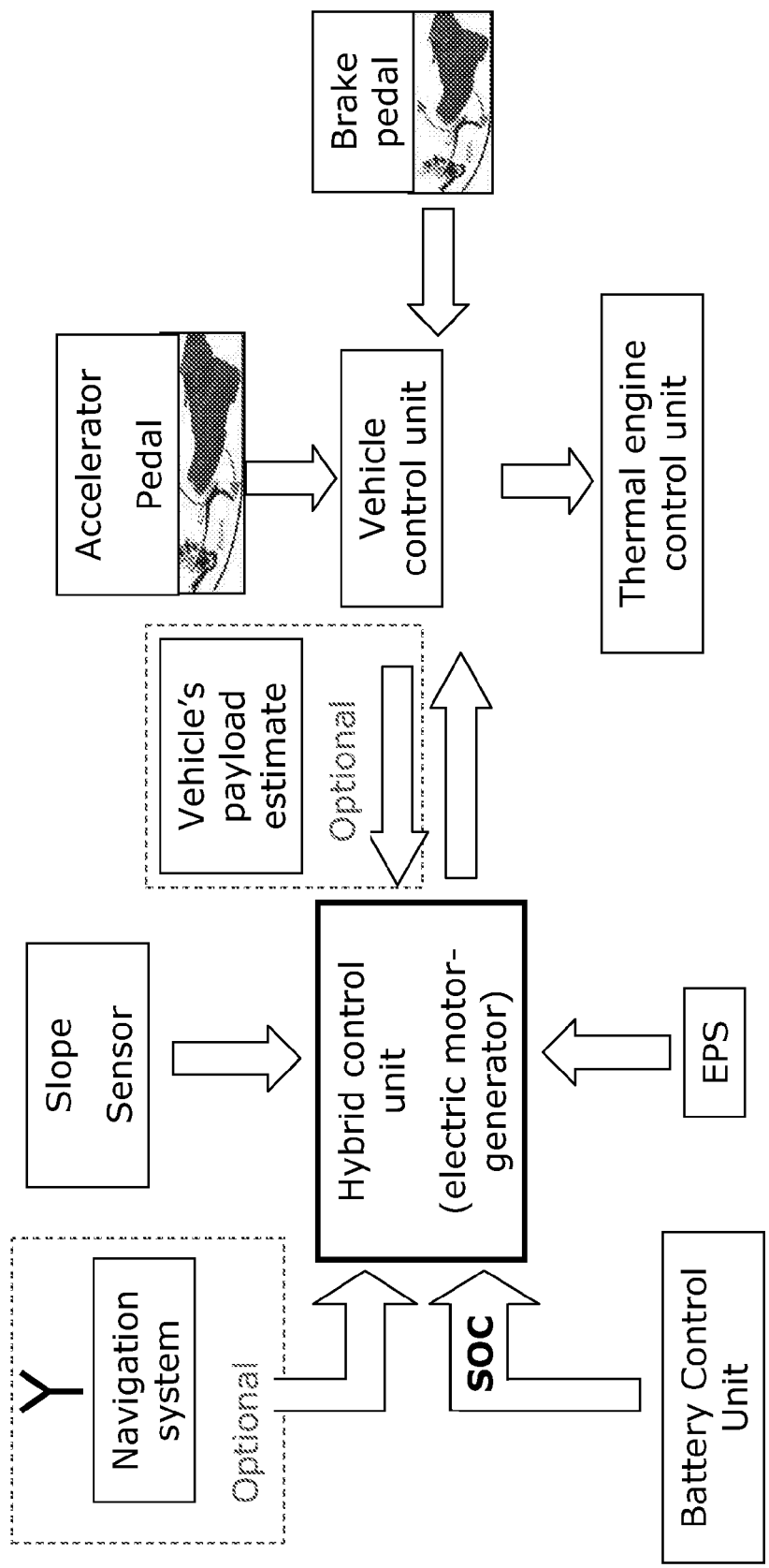
FIG. 2 shows a block diagram of the main vehicle functions involved in actuating the method according to the invention.

With reference to FIG. 2, the control logic includes a hybrid control unit for the functioning of the electric motor-generator, which performs a bidirectional dialogue with the vehicle control unit which dialogues in its turn with the control unit of the thermal engine.

The indications coming from the control unit of the drive battery are available to hybrid control unit, including the indication of the charging status SOC, a road slope sensor, and optionally the data coming from a navigation system and from the estimation of the vehicle's payload.

The indication coming from the EPS system (Electric Power Steering) of the actuator of the electric power steering is also available, and will be described in detail below.

The signals indicating the position of the accelerator pedal and of the brake pedal are also available to the control unit. In particular, as regards the brake pedal, the indication available may be an indication of the ON/OFF type (pedal completely released or completely pressed), or a more precise indication of the specific instant position of the pedal due to the entity of the pressure on it.

With reference to FIGS. 4, 5, 6, and 7 the control logic of the actuation of the stop & start function in a moving vehicle is described.

Figure 4:
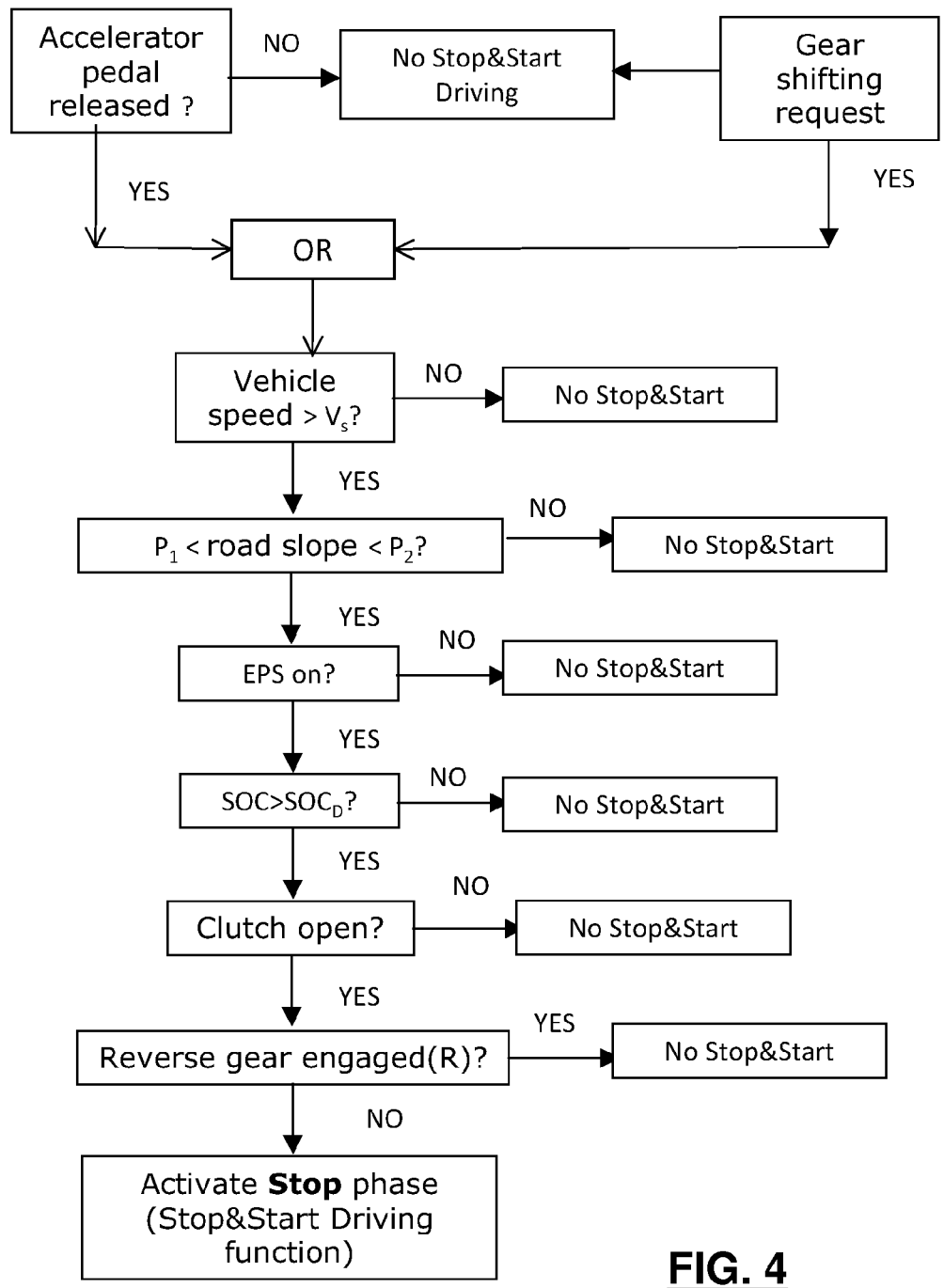
FIG. 4 shows a flowchart of the operations for enabling the stop phase of the method.

FIG. 4 refers to the conditions enabling the STOP phase, wherein the thermal engine is stopped.

The enabling of the stop phase starts from the verification that at any of the two following conditions is present, therefore the conditions are connected by a logic OR:

the accelerator pedal is released, or the automated manual transmission requires a gear shifting.

While the first situation is determined by the action of the driver over the accelerator pedal, the second is independent from the driver, and depends on the information coming from the control unit of the transmission, which informs that there are the conditions for a gear shifting.

After that, the system verifies if the vehicle speed is higher than a threshold value Vs (for example 35 km/h), Steering Activation Speed, namely the vehicle speed exceeding which the electric power steering may be actuated alone; on the contrary, if the vehicle speed is lower than this threshold, stopping the thermal engine will stop the necessary hydraulic contribution to the power steering.

After that the system verifies that the road slope is comprised between two limit values: P1, lower limit value (negative downhill slope, for example −4%), P2 upper limit value (positive uphill slope, for example +4%). In fact for negative slopes lower than the threshold, the vehicle would risk to be in neutral on a steep downhill road, or for positive slopes higher than the threshold the electric motor alone would not be enough to guarantee the drive.

Then the system verifies the activation of the EPS system which controls the electric power steering. The conditions in which it does not activate are for example battery not charged enough, not enough speed, or a failure of the EPS itself. Since the hydraulic contribution to the power steering is not available, the electric part must guarantee by itself all the torque needed for steering, therefore it is important to be sure that the EPS is working, otherwise also the electric contribution to the power steering would be missing.

Then the system verifies the charging status of the drive battery of the electric motor: for example the charging level should always be higher than a threshold $SOC_D$, e.g. 40% of the maximum charging status, in order to guarantee that the electric motor is properly powered.

Then the system verifies the clutch opening, namely the condition wherein the thermal engine is excluded.

One last verification controls that the forward gear is engaged (Drive) and that the reverse gear is not engaged (Reverse).

If only one of the conditions mentioned above is not verified, the thermal engine stopping is inhibited and the STOP phase cannot start (No Stop & Start Driving), otherwise the STOP phase starts.

Figure 5:
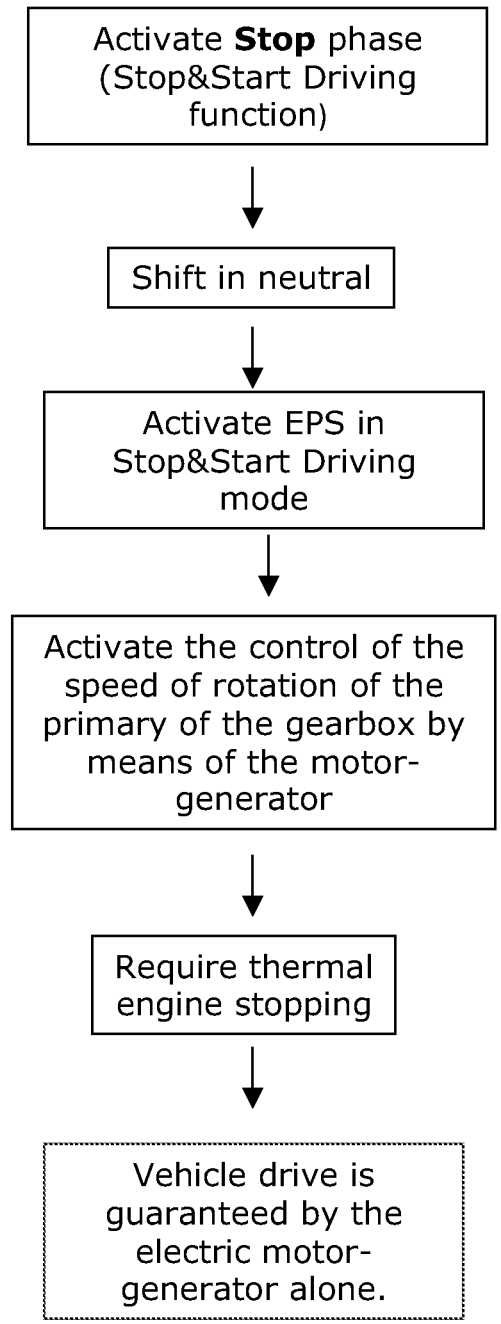
FIG. 5 shows a flowchart of the operations for actuating the stop phase of the method.

FIG. 5 refers to the action needed for the activation of the STOP phase.

When the STOP phase is activated, the gear shift is in neutral.

Then the EPS is put in the "Stop & Start Driving" mode. This is a special mode: since the hydraulic contribution to the power steering is not present, because the thermal engine is stopped, the electric power steering has to provide by itself all the torque needed for steering.

After that, the motor-generator activates the control of the speed of rotation of the primary of the gearbox.

Figure 6:
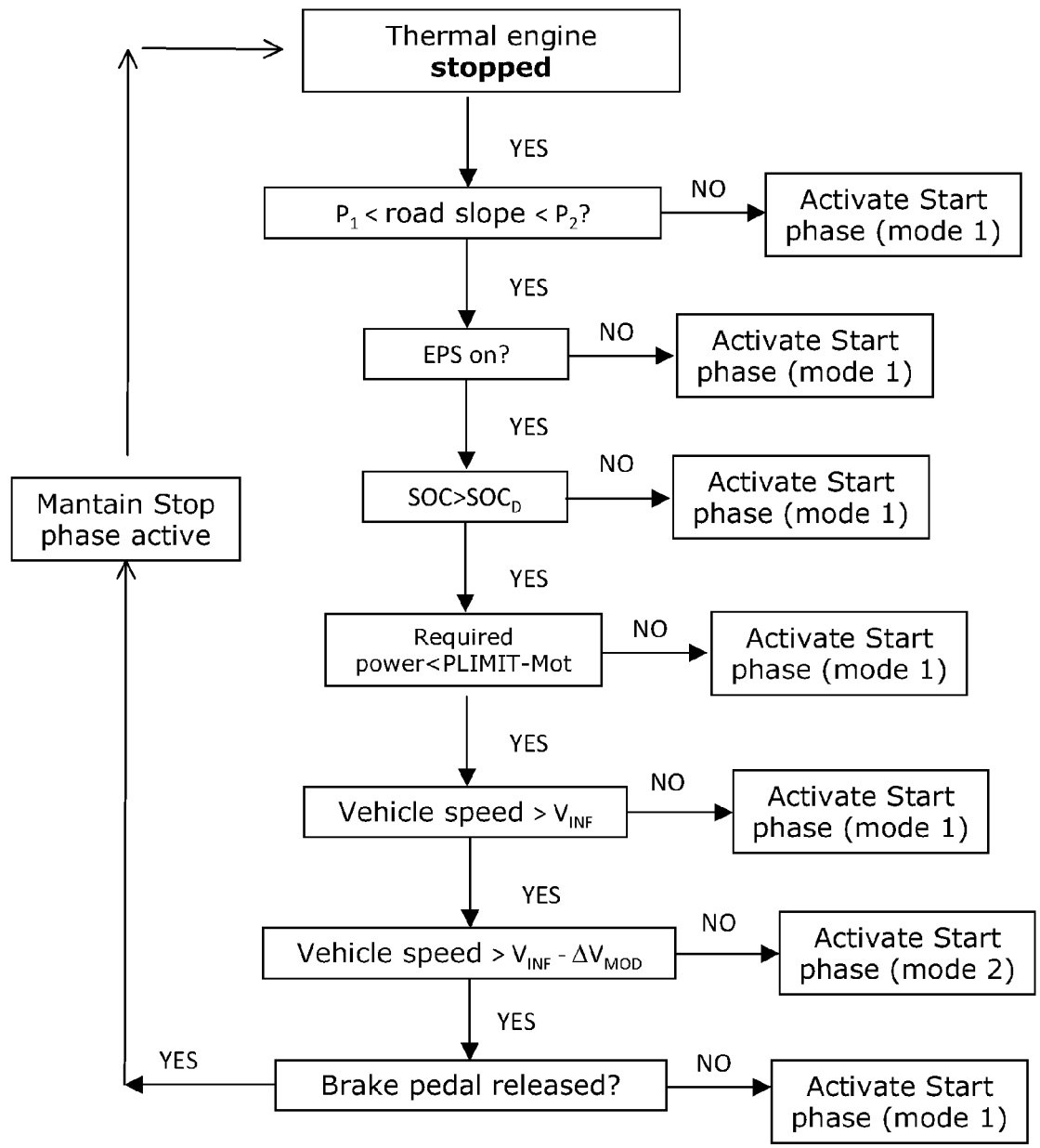
FIG. 6 shows a flowchart of the operations for maintaining the stop phase of the method.

Now the motor-generator assumes the management of the speed of rotation (torque to the gearbox) of the primary of the gearbox, so that, when it intervenes, its speed of rotation is compatible with that of the gearbox in that moment. In fact the electric motor-generator is in constant mesh with the gearbox, but it can be energized or not energized, according to what is needed. In order to avoid jerks when it starts meshing with the gearbox (it should be noted that the clutch is open and is upstream), it has to adapt its initial speed of rotation with the speed of rotation of the gearbox. At this point the thermal engine is stopped, and the vehicle drive is guaranteed only by the electric motor-generator. With reference to FIG. 6, during the STOP phase the logic continuously controls that the conditions allowing the drive with the electric motor-generator alone are maintained, otherwise it determines the shifting to the START phase in order to restart the thermal engine, even if only one of the following conditions is no longer verified.

Starting from the condition of stopped thermal engine, it verifies if the road slope is still comprised between the two values P1 and P2 described above, then it verifies the activation of the EPS system controlling the electric power steering, then it verifies the charging status of the drive battery of the electric motor, whose charging level must be higher than the threshold $SOC_D$.

After that it verifies that the instant power required to the electric motor-generator is lower than the threshold value $P_{LIMIT-Mot}$: the latter is the maximum power value of the electric motor-generator, and is a constructive parameter which depends on the motor-generator installed on the vehicle, for example 44 kW.

Then it verifies the instant speed of the vehicle, in particular if the speed is higher than a first value $V_{INF}$ or if it is lower than the first value but higher than a second value $V_{INF}-\Delta V_{MOD}$. For example $V_{INF}=45$ km/h e $\Delta V_{MOD}=10$ km/h. If the vehicle speed is lower than these speed threshold values, it is necessary to restart the thermal engine. In order to avoid continuous transitions between the start and the stop phases (and vice versa) when the control parameters are near the respective thresholds, an hysteresis should be introduced on each variable. According to the speed value the vehicle had before slowing down, or also to the rapidity of the decreasing speed variation, it chooses which of the two restarting modes of the thermal engine it has to activate, as described below.

After that it verifies if the brake pedal is completely released (OFF condition).

Being all these conditions maintained, the drive can continue with the electric motor-generator alone, otherwise there is the shifting to the START phase in order to restart the thermal engine, in the normal way according to the first mode described below, otherwise by means of the second mode.

Figure 7:
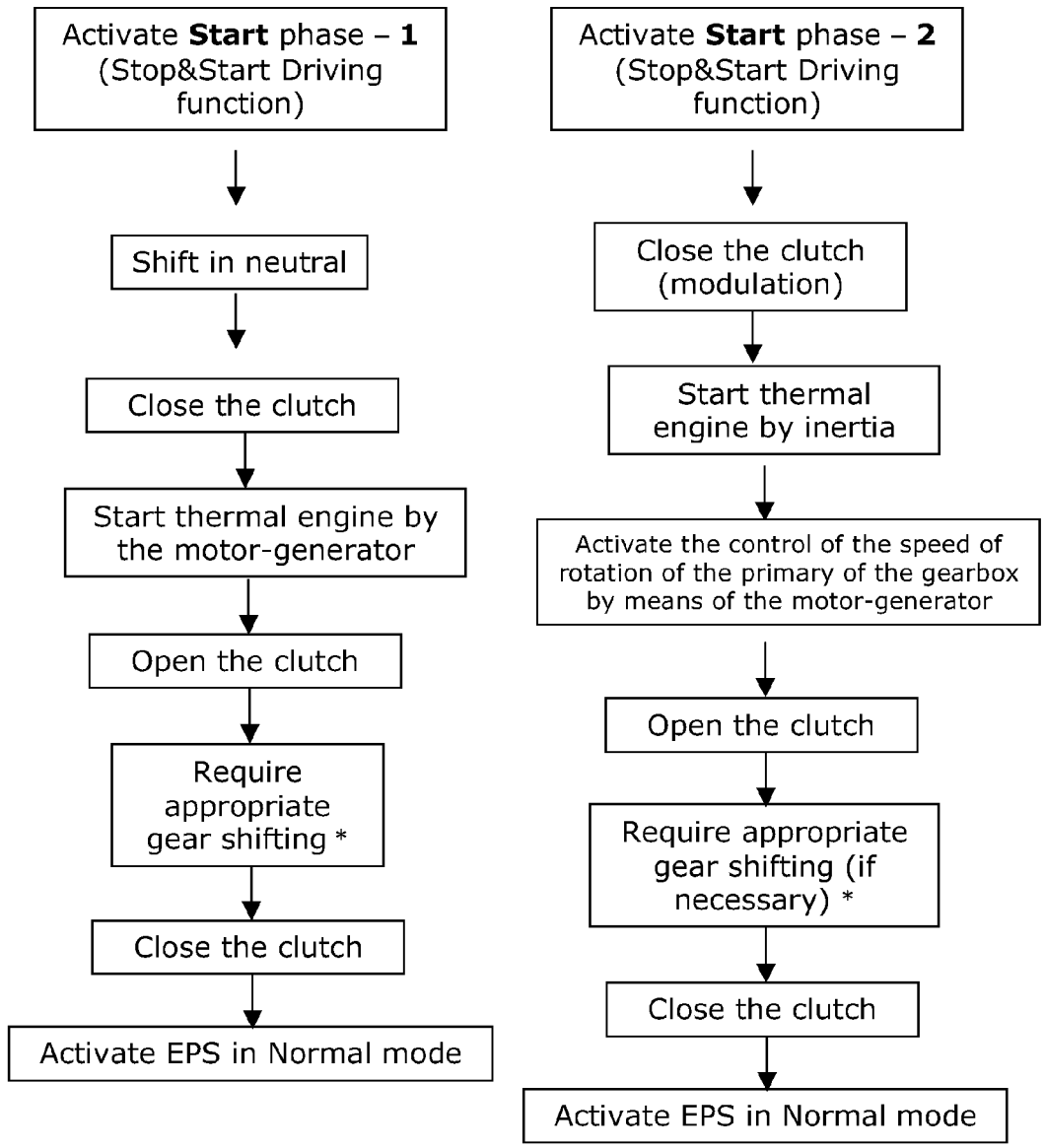
FIG. 7 shows a flowchart of the operations for activating the start phase of the method.

With reference to FIG. 7, two activation modes of the START phase are possible.

mode "Activate Start phase—1 (Stop&Start Driving function)":

First the gear is shifted in neutral: since the transmission is an automated manual transmission, this shifting is automatic.

Then the clutch is closed and the thermal engine is restarted by using the electric motor.

Then the clutch is opened and the appropriate gear for the vehicle speed is requested to automated manual transmission. Then the clutch is closed again.

Now the EPS system shifts to the "normal" mode, wherein the hydraulic power steering is activated again.

mode "Activate Start phase—2 (Stop&Start Driving function)":

The clutch is automatically operated by modulating a slight clutch slip, with the gearbox in mesh, and the thermal engine is restarted by exploiting the vehicle's inertia, since it is moving at a certain speed.

The control of the speed of rotation of the primary of the gearbox is activated again by means of the motor-generator, which controls the vehicle speed in order to avoid jerks.

Then the clutch is opened again, and the engaging of the appropriate gear is required, if a gear shifting is necessary.

Finally the clutch is closed again and the EPS system shifts to the "normal" mode, wherein the hydraulic power steering is activated again.

Therefore in the first case the clutch is opened, the thermal engine is started, and then the clutch is closed, while in the second case the thermal engine is restarted with the clutch closed, then the clutch is opened for a possible gear shifting, with less transitions.

In the second case the components are subject to more wear, especially the clutch, but the transition is faster.

Therefore the choice of the activation mode of the START phase is performed according to the evaluation of the speed value the vehicle had before slowing down or also of the rapidity of the decreasing speed variation.

This kind of evaluation can be performed if a signal indicating the position of the brake pedal is available, by which it is possible to determine the braking graduality, and therefore the graduality of the speed variation of the vehicle. Then, according to the position gradient, for a sudden braking, namely for a fast decreasing speed variation, the faster mode 2 is actuated, on the contrary for a slow and gradual braking it is possible to actuate mode 1.

Therefore it is possible to increase the time wherein the electric motor is working and the thermal engine is stopped. The parameters $SOC_D, V_{INF}, \Delta V_{MOD}$ P1 and P2 may dynamically vary if the information on the road in front of the vehicle is available, being obtained by maps, calculation of the vehicle position on a map (optional—info from the Navigation System) and or if the information on the vehicle payload estimation is available.

Figure 3:
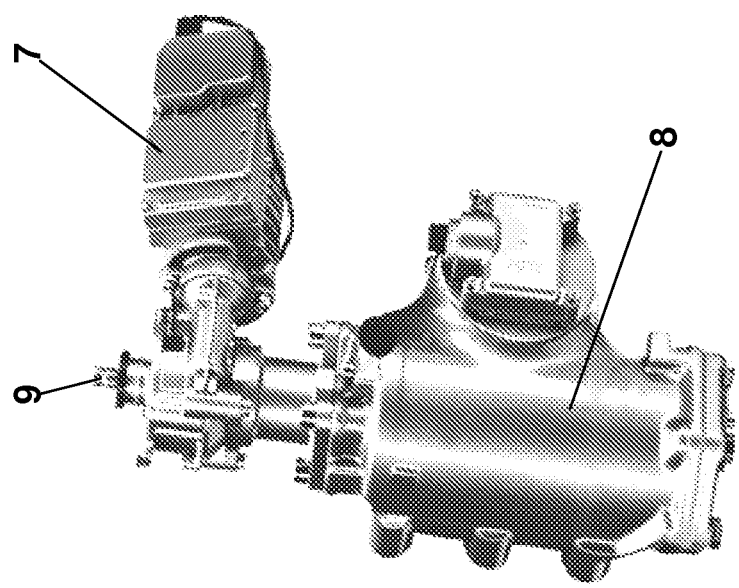
FIG. 3 shows an embodiment of the power steering device.

According to an aspect of the invention described above, the power steering is actuated by means of a coupling of a hydraulic and an electric system. A possible embodiment is illustrated in FIG. 3.

The actuation is obtained by means of a steering system formed by an electric power steering actuator 7 keyed on the column 9 of a conventional hydraulic system 8 by means of an appropriate reduction unit. A specially provided control unit reads position signals, torque to the steering and vehicle speed, and controls the electric motor of the electric power steering which provides the right torque for steering the vehicle with a good comfort and a low effort by the driver. The hydraulic actuator is controlled by the thermal engine, therefore when the latter is stopped the actuator does not work.

The electric actuator, on the contrary, is controlled by the EPS system according to the following operating modes.

EPS in "Stop&Start Driving" mode: The power steering is guaranteed only by the electric actuator keyed on the column, since when the thermal engine is stopped the contribution of the hydraulic system is null.

EPS in "Normal" mode: The power steering is formed by the combination of the electric actuator and the hydraulic system both being active and keyed on the same shaft (active thermal engine). The torque split between the two actuators may provide for example that the contribution of the electric actuator tends to decrease as the vehicle speed increases, since the hydraulic system is able to provide all the necessary torque in order to obtain an optimal power steering, while at low speed (or at zero speed) the contribution are added to each other, since the maximum of the torque is required.

The present invention may advantageously be realized by means of computer programs loaded on the various electronic control units of the vehicle, which comprises program code means performing one or more steps of said method, when said program is run on a computer. For this reason the scope of the present patent is meant to cover also said computer programs and the computer-readable means that comprise a recorded message, such computer-readable means comprising the program code means for performing one or more steps of such method, when such programs are run on a computer.

It will be apparent to the person skilled in the art that other alternative and equivalent embodiments of the invention can be conceived and reduced to practice without departing from the scope of the invention.

From the description set forth above it will be possible for the person skilled in the art to embody the invention with no need of describing further construction details.

The invention claimed is:

1. A method for actuating the stop & start function in a moving vehicle, especially an industrial or commercial or special vehicle, the method comprising:
preparing a vehicle equipped with hybrid drive of the parallel type, comprising a thermal engine, an electric motor-generator, a single clutch unit placed between the two engines, an automated manual transmission, and a hybrid power steering both hydraulic and electric;
enabling of a stop phase, in which the motor-generator assumes the management of the speed of rotation of a primary of the gearbox;
activation of the stop phase;
maintaining of the stop phase; and
activation of the start phase;
wherein said enabling step of the stop phase comprises the following verifications:
released accelerator pedal or gear shifting request by the automated manual transmission;
vehicle speed higher than a first threshold value (Vs);
road slope comprised between two limit values (P1, P2);
activation of a control system (EPS) of the electric power steering;
verification that the charging status of a drive battery of the electric motor is higher than a threshold value ($SOC_D$);
verification of the opening status of the clutch;
verification of engagement of the forward gear;
said enabling of the stop phase being performed only if all the conditions mentioned above are verified.

2. The method for actuating the stop & start function in a moving vehicle according to the claim 1, wherein said activation of the stop phase comprises the steps of:
gear in neutral;
control system (EPS) of the electric power steering in "Stop & Start Driving" mode, wherein only the electric power steering is activated;
activation of a control of the rotational speed of the primary of the gearbox by means of the electric motor-generator;
stopping of the thermal engine.

3. The method for actuating the stop & start function in a moving vehicle according to the claim 2, wherein said maintaining of the stop phase is actuated when all the following conditions are verified, otherwise the start phase is activated:
road slope comprised between said two limit values (P1, P2);
activation of said control system (EPS) of the electric power steering;
verification that the charging status of the drive battery of the electric motor is higher than a threshold value ($SOC_D$);
instant power required to the electric motor-generator lower than the threshold value ($P_{LIMIT-Mot}$);
vehicle speed higher than a first threshold value ($V_{INF}$) or if lower than the first value but higher than a second threshold value ($V_{INF}-\Delta V_{MOD}$);
brake pedal completely released.

4. The method for actuating the stop & start function in a moving vehicle according to claim 3, wherein said enabling of the start phase is actuated according to a first or a second mode, on the basis of the evaluation of the speed value the vehicle had before slowing down, or also of the rapidity of the decreasing speed variation, referred to said first threshold value ($V_{INF}$) or said second threshold value ($V_{INF}-\Delta V_{MOD}$).

5. The method for actuating the stop & start function in a moving vehicle according to the claim 4, wherein said first mode is actuated in case of a speed higher than said first threshold value ($V_{INF}$) and includes actions of:
gear shifting in neutral;
clutch closing;
thermal engine restarting by using the electric motor;
clutch reopened, with gear shifting request to the automated manual transmission;
clutch closing;
shifting of the control system (EPS) of the electric power steering to the "normal" mode, wherein the hydraulic power steering is activated again.

6. The method for actuating the stop & start function in a moving vehicle according to the claim 4, wherein said second mode is actuated in case of a speed lower than said first threshold value but higher than the second threshold value, and includes actions of:
automatic operating of the clutch by modulating a slight clutch slip, with the gearbox in mesh;
thermal engine restarting by using the vehicle's inertia;
activation of the control of the rotational speed of the primary of the gearbox by means of the electric motor-generator;
clutch reopened, with gear shifting request to the automated manual transmission;
shifting of the control system (EPS) of the electric power steering to the "normal" mode, wherein the hydraulic power steering is activated again.

* * * * *